United States Patent [19]

Mondt et al.

[11] Patent Number: 4,522,972

[45] Date of Patent: Jun. 11, 1985

[54] PROCESS FOR THE PREPARATION OF AN AQUEOUS COPOLYMER DISPERSION

[75] Inventors: Josef Mondt, Königstein; Thaddäus Wirth, Heidenrod-Wisper, both of Fed. Rep. of Germany

[73] Assignee: Hoechst Aktiengesellschaft, Frankfurt am Main, Fed. Rep. of Germany

[21] Appl. No.: 398,415

[22] Filed: Jul. 14, 1982

[30] Foreign Application Priority Data

Jul. 16, 1981 [DE] Fed. Rep. of Germany ....... 3128062

[51] Int. Cl.$^3$ .................. C08L 37/00; C08L 39/00
[52] U.S. Cl. ................... 524/548; 524/555; 524/556; 524/558; 524/560; 524/562; 525/185
[58] Field of Search ............... 324/555, 556, 562, 560, 324/558, 577, 548

[56] References Cited

U.S. PATENT DOCUMENTS 4,276,210  6/1981  Hohlein et al. .................. 524/555
4,395,499  7/1983  Rosenski et al. ................. 524/555

FOREIGN PATENT DOCUMENTS 1574721  9/1980  Canada.
1565529  12/1976  Fed. Rep. of Germany.

Primary Examiner—Paul R. Michl
Assistant Examiner—J. M. Reddick
Attorney, Agent, or Firm—Curtis, Morris & Safford

[57] ABSTRACT

An aqueous copolymer dispersion can be prepared, with a particular choice of the monomers and the ratios of their amounts, from styrene, esters of acrylic or methacrylic acid, vinyl esters, monomers containing hydroxyl groups, acrylic and/or methacrylic acid, acrylamide or methacrylamide and addition compounds of glycidyl esters of branched monocarboxylic acids with unsaturated carboxylic acids, by polymerization in the presence of an anionic emulsifier and a radical initiator and, if appropriate, a non-ionic emulsifier, which dispersion, in combination with an aminoplast resin, provides thermosetting coatings with excellent properties. These coatings provide highly elastic, weather-resistant, water-resistant surface coatings, which have high adhesion and are free of flaws, on metallic substrates.

3 Claims, No Drawings

PROCESS FOR THE PREPARATION OF AN AQUEOUS COPOLYMER DISPERSION

The invention relates to a process for the preparation of an aqueous copolymer dispersion and the use of this dispersion for the preparation of coatings which can be crosslinked by the action of heat (thermosetting coatings).

Aqueous copolymer dispersions are of particular interest for the preparation of thermosetting coatings, because they are not flammable and they are less physiologically objectionable than coating agents containing solvents. Furthermore, there is no necessity to recover a costly solvent. In addition to the properties which are required of all plastics dispersions, such as a good flow behavior, good processability, freedom from coagulation, storage and heat stability, it is also particularly important for copolymer dispersions which are to be used as binders for the preparation of thermosetting coatings that coating agents are obtained which level well and adhere well, which dry even at room temperature and which show no cracks or other irregularities in the film. The coatings obtained from these should then be curable by heat treatment. For this purpose, the copolymers on which the dispersions are based have reactive groups in the molecule which react with the reactive groups of certain resins, in particular aminoplast resins, so that the binder crosslinks.

In addition to the advantages such as, for example, low viscosity at a high content of solids, high molecular weight and the absence of volatile solvents, aqueous copolymer dispersions also have disadvantages for thermosetting coatings such as, for example, a lack of pigment wetting, deficient adhesion to the substrate, poor leveling of the coating agents manufactured using this dispersion and inadequate elasticity of the baked films, but particularly low gloss and low resistance to water.

In a test method, which is frequently used in paint technology, the lacquer film, which has been sprayed onto metallic substrates and baked in an oven heated by circulating air, is tested with a moist wad of absorbent cotton and the time necessary for the lacquer film to swell and soften, until it can be damaged by simple mechanical stress (for example scratching with a spatula), is measured. A good baking varnish is expected to have water-resistance values by this method which are in the order of magnitude of 800 hours (about 1 month).

The addition of leveling agents ("confluence agents", coalescence agents) to thermosetting coating agents, which contain as the binder aqueous dispersions based on acrylic polymers, to improve the leveling, is known (cf. German Offenlegungschriften Nos. 2,211,169, 2,252,065, 2,416,446 and 2,505,829=U.S. Pat. Nos. 3,962,167, 4,020,219, 4,132,688, 3,904,795 and 4,137,205). These agents assist the flowing together of the coating during drying in air before baking. The following are used: long-chain alcohols, dimethylformamide, tributyl phosphate, polyethylene or polypropylene glycols, 2-butoxyethanol acetate, diacetone alcohol, 3,5,5-trimethyl-2-cyclohexen-1-one, caprolactam, addition products of polyhydric alcohols with $C_2$ to $C_4$ epoxides or dissolved and compatible copolymer resins.

The disadvantage of the additives mentioned is that there are adverse effects, not only on the gloss and leveling, but also on other technological properties of the films due to the hydrophilic and low molecular weight additives. In particular, the resistance to water and chemicals of the baked coatings suffer adverse effects.

According to the German Offenlegungsschrift No. 2,709,308, specifically for improving the water-resistance of coatings which have been prepared using dispersions of thermosetting copolymers, in the preparation of the dispersions, alkali metal or alkaline earth metal ions, for example from initiators and emulsifiers, should be replaced by ammonium ions. However, even with dispersions of this type, water-resistances of only about 120 hours are achieved.

The object of the invention is to make an aqueous dispersion of a copolymer which can be crosslinked with an aminoplast resin by the action of heat and which leads to coatings which have good leveling and are free of flaws, and which, in particular, are water-resistant, on metallic substrates.

It has been found that aqueous copolymer dispersions can be prepared, with a particular choice of the monomers and the ratios of their amounts, from styrene, esters of acrylic or methacrylic acid, vinyl esters, monomers containing hydroxyl groups, acrylic and/or methacrylic acid, optionally acrylamide and/or methacrylamide and addition compounds of glycidyl esters of branched monocarboxylic acids with unsaturated carboxylic acids, by polymerization in the presence of an anionic emulsifier and a radial initiator and, if appropriate, a non-ionic emulsifier, which dispersions, in combination with aminoplast resins, provide thermosetting coatings with excellent properties. These coatings provide highly elastic, weather-resistant, water-resistant surface coatings, which have high adhesion and are free of flaws, on metallic substrates.

Thus, the invention relates to a process for the preparation of an aqueous dispersion of a copolymer which can be crosslinked with an aminoplast resin by the action of heat and which is prepared by copolymerization of at least two monomers from the group comprising styrene, esters of acrylic acid, esters of methacrylic acid, vinyl esters, monoolefinic unsaturated monomers having hydroxyl groups, acrylic acid, methacrylic acid, unsaturated amides and other functional comonomers, in an aqueous phase in the presence of a radical-forming initiator and an emulsifier, which comprises copolymerizing a mixture of 30 to 60 parts by weight of styrene and/or methyl methacrylate, 20 to 50 parts by weight of an ester of acrylic acid or of methacrylic acid, the homopolymer of which has a glass temperature $T_G$ below $+50°$ C., or a mixture of these esters, 5 to 30 parts by weight of a vinyl ester of a branched saturated monocarboxylic acid, which has side chains having 8 to 12 carbon atoms and in which the carboxyl group is on a tertiary carbon atom, 5 to 15 parts by weight of a hydroxyalkyl ester of a monoolefinic unsaturated monocarboxylic acid, 0.5 to 15 parts by weight of an $\alpha,\beta$-unsaturated monocarboxylic acid and/or unsaturated dicarboxylic acid, and 0.1 to 8 parts by weight of an addition product of a glycidyl ester of a branched monocarboxylic acid with an unsaturated monocarboxylic or dicarboxylic acid.

The invention also relates to the use of the copolymer dispersion, prepared in this manner, for the manufacturing of coatings which can be crosslinked by the action of heat.

30 to 60, preferably 35 to 55, parts by weight of styrene and/or methyl methacrylate are employed as the monomers which serve as the "hardening" component. Methyl methacrylate is preferably employed.

The mixture of monomers to be employed contains as the "plasticizing" component 20 to 50, preferably 25 to 45, parts by weight of an ester of acrylic acid or of methacrylic acid, the homopolymer of which has a glass temperature $T_G$ below $+50°$ C., or mixtures of these esters. Examples of these monomers are ethyl acrylate, propyl acrylate, isopropyl acrylate, and n- and i-butyl, 2-ethylhexyl and decyl acrylates and methacrylates.

Furthermore, the mixture of monomers to be employed contains 5 to 30, preferably 8 to 26, parts by weight of a vinyl ester of a branched saturated monocarboxylic acid which has side chains having 8 to 12 carbon atoms and the carboxyl group on a tertiary carbon atom. This type of carboxylic acid can be obtained by Koch's method of synthesis from olefins, carbon monoxide and water. The vinyl ester of a branched saturated monocarboxylic acid having a total of 10 carbon atoms, the carboxyl group of which is on a tertiary carbon atom, is preferably used.

In order to achieve an adequate reactivity of the coating mixture to be manufactured from the dispersion, an additional monomer employed, in an amount of 5 to 15, preferably 6 to 12, parts by weight, is a hydroxyalkyl ester of a monoolefinic unsaturated monocarboxylic acid, for example hydroxyethyl acrylate, 2-hydroxypropyl acrylate, hydroxyethyl methacrylate, 2-hydroxypropyl methacrylate, 4-hydroxybutyl methacrylate, glycerol monomethacrylate, trimethylolpropane monoacrylate, reaction products of hydroxyethyl methacrylate with 2-8 moles of ethylene oxide, neopentylglycol monomethacrylate and triethylene glycol monoacrylate.

The incorporation of unsaturated monocarboxylic acids into the copolymer increases the stability of the dispersion during manufacture, storage and use. High shear forces occur particularly for industrial lacquers during the manufacture and application of the coating agents. For this reason, the mixture of monomers to be employed contains 0.5 to 10, preferably 1 to 8, parts by weight of an $\alpha,\beta$-unsaturated monocarboxylic acid and/or an unsaturated dicarboxylic acid. Suitable acids re acrylic acid, methacrylic acid, crotonic acid, maleic acid, fumaric acid and itaconic acid. Acrylic acid and/or methacrylic acid are preferably used.

In addition, the mixture of monomers to be employed contains 0.1 to 8, preferably 1 to 6, parts by weight of an addition product of a glycidyl ester of a branched monocarboxylic acid with an unsaturated monocarboxylic and/or dicarboxylic acid. A suitable branched monocarboxylic acid is represented by a mixture of carboxylic acids having 9 to 11 carbon atoms. Examples of suitable unsaturated monocarboxylic and dicarboxylic acids are acrylic, methacrylic, crotonic and maleic acid. The use or acrylic and/or methacrylic acid is preferred.

Finally, the mixture of monomers to be employed advantageously additionally contains 0.1 to 5, preferably 1 to 4, parts by weight of an unsaturated amide, for example acrylamide or methacrylamide or a mixture of unsaturated amides. These monomers contribute both to the stabilization of the copolymer dispersion and also to the crosslinking of the coating agent manufactured using this dispersion on baking.

The selection of the type and amount of the monomers depends on the requirements placed on the baked coating in respect of resistance to water, weathering, solvents and chemicals. The composition of the monomer mixture should be laid down within the scope of the previously mentioned ranges of amounts so that a copolymer dispersion is obtained which has a minimum film-formation temperature (MFT) in the range from 0° to 70° C., preferably 10° to 60° C.

The process according to the invention is carried out in the presence of an emulsifier. This emulsifier is preferably an anionic emulsifier; instead of a single emulsifier, a mixture of various emulsifiers can also be employed. Examples of anionic emulsifiers are the alkali metal salts of the hemisulfates of alkylphenols or alcohols, and also the hemisulfates of oxethylated alkylphenols of oxethylated alcohols, or also an alkylsulfonate or arylsulfonate, preferably the alkali metal salts of the hemisulfate of a nonylphenol which has been reacted with 4–5 moles of ethylene oxide, and also sodium lauryl sulfate, sodium laurylethoxylate sulfate and secondary sodium alkanesulfonates, the carbon chains of which contain 8–20 carbon atoms. The amount of the anionic emulsifier is 0.1–5.0% by weight, preferably 0.5–3.0% by weight, relative to the monomers. In addition, in order to increase the stability of the aqueous copolymer dispersion, it is possible also to employ a non-ionic emulsifier of the type of an ethoxylated alkylphenol or fatty alcohol, for example an addition product from one mole of nonylphenol and 4–30 moles of ethylene oxide mixed with an anionic emulsifier, also in an amount of 0.1 to 5.0, preferably 0.5–3.0% by weight, relative to the monomers.

In addition a fluorinated surfactant may be used as the emulsifier. The term fluorinated surfactant is understood to mean surface-active compounds which contain perfluoroalkyl radicals having 2 to 20 carbon atoms or perfluoroaralkyl radicals having 8 to 30 carbon atoms. Examples of this type of compound are perfluoroalkylsulfonic acids, perfluoroaralkylsulfonic acids, long-chain perfluorocarboxylic acids, perfluoroalkanephosphonic acids, perfluoroalkanephosphinic acids, the salts of these acids, perfluoroalkyl sulfates and perfluoroaralkyl sulfates.

The polymerization process according to the invention is carried out as an emulsion polymerization in an aqueous medium in the known equipment, for example, in a vessel provided with a stirrer and having arrangements for heating and cooling. The addition of monomers can be carried out in such a manner that a solution of the total water, the emulsifier and a part of the initiator is initially introduced and the mixture of monomers and the remainder of the initiator are slowly added at the polymerization temperature. However, it is also possible intiailly to introduce a part of the water and the emulsifier and to prepare a pre-emulsion from the remainder of the water and the emulsifier and from the monomers, which pre-emulsion is introduced into the polymerization medium. The polymerization is preferably carried out in such a manner that 30–50% by weight of the water and 10–15% by weight of the emulsifier, if appropriate, mixture of emulsifiers, are initially introduced and a pre-emulsion is prepared from the monomers, the remaining part of the water and the residual emulsifiers, which pre-emulsion is metered into the heated material, which has been initially introducd, over 1-3 hours.

The process according to the invention is carried out in the presence of a radical-forming initiator, in particular a peroxide compound or an aliphatic azo compound. The initiator is water-soluble or monomer-soluble. A water soluble initiator is preferably used.

Suitable initiators are the customary inorganic percompounds, in particular ammonium salts or alkali metal salts of peroxydisulfuric acid and peroxydiphosphoric acid, for example sodium peroxydisulfate, potassium peroxydisulfate, ammonium peroxydisulfate, ammonium peroxydiphosphate, sodium peroxydiphosphate and potassium peroxydiphosphate. Initiators which are insoluble in water but which are soluble in the monomers can also be used, for example, benzoyl peroxide, cumol hydroperoxide, di-tert.-butyl peroxide, butyl hydroperoxide and perisopivalate, which can also be employed to some extent in combination with reducing agents, such as sodium disulfite, hydrazine, hydroxylamine and with catalytic amounts of accelerators, such as salts of iron, cobalt, cerium and vanadyl.

Water-soluble initiators are preferably used. It is also possible to use a combination of water-soluble and organic peroxides. In particular cases, it is advisable to add a buffer substance, for example sodium bicarbonate, to the polymerization batch, in order to maintain the pH in the range from 3-5.

In order to regulate the molecular weight, a compound is used which can be used as a chain terminator in the polymerization of acrylate monomers. Apart from perhalogenated hydrocarbons, there can be used any compound having the formula R—SH in which R denotes an alkyl radical, aryl radical or aralkyl radical, preferably an alkyl radical having 2-18 carbon atoms. Examples of regulators of this type are ethyl mercaptan, n-butyl mercaptan, n-octyl mercaptan, lauryl mercaptan and t-dodecyl mercaptan. The regulator is employed in an amount of 0.01-5.0% by weight, preferably of 0.5-3.0% by weight, relative to the total of the monomers. If a particularly high molecular weight is demanded for certain areas of use, the emulsion polymerization is carried out without a regulator.

The polymerization temperature is in the range from 20° to 100° C., preferably 40° to 90° C.

After completion of the addition of the mixture of monomers, the total batch is stirred for a further 1-3 hours at 60°-90° C., preferably at 70°-85° C. Subsequently, the dispersion is adjusted to a pH of 7.5-9.5 with a tertiary amine, for example triethylamine, diethanolmonomethylamine, triethanolamine, dimethylisopropylhydroxymethylamine, dimethylaminoethanol, dimethylaminopropanol or diethylaminoethanol. A particularly good pigment wetting of the dispersion, and thus good technological coating properties, is obtained particularly by the use of diethanolmonomethylamine dimethylaminoethanol and dimethylaminopropanol.

The copolymers obtained by the process according to the invention have glass transition temperatures ($T_G$) in the range from 0° to +60° C., preferably from +10° to +50° C. The process according to the invention leads to copolymers which have a mean particle size (particle diameter) of 0.05 to 0.2 $\mu m$, preferably from 0.06 to 0.15 $\mu m$.

The aqueous copolymer dispersion obtained according to the invention has a solids content of 20 to 60% by weight, preferably 30 to 50% by weight, and provides, when mixed with an aminoplast resin which is soluble and/or dispersible in water, thermosetting coatings which have excellent leveling and provide undercoats, fillers, top coats and single-layer coatings of particular elasticity, adhesion and resistance to corrosion and weathering, in particular resistance to water.

Aminoplast resins are understood to be the thermosetting reaction products of aldehydes, preferably formaldehyde, with polyfunctional amines, for example urea and triazines, such as melamine or benzoguanamine. These resins are frequently etherified, for example with methanol, in order to promote the solubility in water. A melamine resin which is frequently used is hexamethoxymethylmelamine, which gives clear solutions in water and thus can be metered especially easily and leads to mixtures of binders having good storage stability.

In addition, conventional alkylated, for example butylated, melamine-formaldehyde resins can be used, provided that they satisfy the requirements of water-solubility, of compatibility or of dispersibility in the finished formulation of the coating system.

The aqueous copolymer dispersion obtained according to the invention is mixed with the aminoplast resin in such a manner that (relative to the total resin solids) 5-40% by weight of aminoplast resin, preferably 10-30% by weight, are contained in the mixture.

The copolymer dispersion can be formulated with an aminoplast resin to give transparent lacquers of pigmented lacquers. The procedure for the manufacture of the lacquers is frequently such that pigments and/or fillers, together with customary lacquer auxiliaries, if appropriate curing catalysts and, if appropriate, neutralizers, are mixed to a pigment paste which is then mixed with the binder system. However, it is frequently also possible for the aminoplast resin to serve as mixing resin (pigment-wetting agent) in the manufacture of the pigment paste.

All the products customary in the paint and varnish industry, can be employed as pigments and/or fillers, providing that they are sufficiently stable under alkaline conditions, so that the finished coating agent can be stored for several months. The pigment can be added to the batch in the manner customary for the manufacture of pigmented aqueous dispersion paints. In lacquer formulations with aqueous copolymer dispersions, the gloss is frequently improved if the pigment is milled into the aminoplast resin and then the aqueous pigment paste is mixed into the aqueous copolymer dispersion. An example of a typical pigment for manufacturing white lacquers is titanium dioxide.

Apart from the aminoplast resins, various products can be employed as the pigment-wetting agent, and natural or synthetic polymers, which are dilutable with or soluble in water and the water-affinity of which is produced by a relatively large number of hydrophilic molecular constituents, are mostly employed. According to German Offenlegungsschrift No. 2,505,829, for example, high-boiling adducts of aliphatic polyhydric alcohols and epoxides, having a molecular weight of 300-6,000, are employed.

In the formulation of pigmented coating compositions, it is frequently necessary also to employ so-called dispersants. In this context, the action of the dispersant on the properties of the finished film must be taken into account, for example the action on the water-resistance. The dispersants employed are, for example, the ammonium salts or alkali metal salts of polymeric carboxylic acids such as polyacrylic acid or polymethacrylic acid. The amount of dispersant used depends on the type and the amount of the pigments employed and the binders.

A particular advantage of the copolymer dispersion prepared according to the invention is the good compatibility with a so-called pigment-wetting resin, which is employed as a particularly effective pigment-wetting agent and which preferably has a monomer composition similar to that of the copolymer employed as the binder. This pigment-wetting resin is a copolymer, which is dilutable with water, based on esters of acrylic or methacrylic acid and hydrophilic monomers, which is prepared by known methods by radical copolymerization in an organic solvent which can be diluted with water. After the copolymerization, the pigment-wetting resin is neutralized with a tertiary amine. The pigment-wetting resin in its form for use is a clear aqueous solution and is suitable for the manufacture of stable pigment formulations with inorganic pigments. The gloss and the leveling of the baking varnish are frequently improved by using a pigment-wetting resin.

Commercially available natural or synthetic polymers, which are dilutable with or soluble in water and the water affinity of which is produced by a relatively large number of hydrophilic molecular constituents, can also be used as the pigment-wetting agent. Examples for this type of product are polyethers, such as polyethylene oxides and polypropylene oxides.

The finished formulations of the coating agent can also have a tertiary amine added to increase the storage stability. The preferred pH range is 7–9.

In order to decrease the baking temperature, the coating agents can also be mixed with a curing catalyst. A catalyst which is frequently used is paratoluenesulfonic acid.

The coating agent based on the copolymer dispersion obtained according to the invention can be applied to a large number of substrates, which must, of course, be stable at the baking temperature. For this reason, metallic substrates are particularly suitable, for example objects made of iron, steel, aluminum, copper, bronze and brass. Ceramic surfaces, glass and wood can also be coated. Emulsion lacquers can, for example, be applied to the substrates using spray guns, or by brush, squeegee, roller or by dipping. In practice, the coated object is predominantly aired and dried in air at room temperature or at a temperature which is only slightly elevated. Then the coating is cured by "baking" at a temperature from 80°–180° C. The coatings are baked, as a rule, for a period of 10–30 minutes. The layer thicknesses of the baked coatings are in the range from 15 to 80 $\mu$m, preferably 25 to 60 $\mu$m.

Baked transplant lacquer films and pigmented lacquer films based on the copolymer dispersion prepared according to the invention are distinguished by unexpectedly high resistance to water. In addition, these lacquer films exhibit good covering, smoothness, elasticity, gloss, adhesion and resistance to weathering and yellowing. A good chemical resistance is exhibited particularly towards water, solvents and alkaline and acid agents. The copolymer dispersion is very well suited for the manufacture of double-layer metallic lacquers. This type of lacquers formulated with the aid of this dispersion exhibited exceptional resistance in the known "Florida test", thus, for example, metallic silver lacquers only lost about 10% of gloss within 12 months.

The following examples serve to illustrate the invention in more detail. Percentages and ratios relate, in each case, to the weight, and the amounts of solutions and dispersions relate, in each case, to the solid material.

The polymerization experiments were carried out in a multineck flask having a stirrer, thermometer, dropping funnel and a thermosta-ted bath.

If a mercaptan was used as the regulator, care was taken that the mercaptan was added to the mixture of monomers or the pre-emulsion only shortly before the start of the metering-in, since if the mixture of monomers or pre-emulsion, containing the mercaptan, is allowed to stand for some time, a yellow or brown coloration occurred.

EXAMPLE 1

A monomer emulsion was prepared from
400 g of styrene
200 g of ethyl acrylate
200 g of vinyl ester of a branched saturated $C_{10}$-monocarboxylic acid having a carboxyl group on a tert. carbon atom
80 g of hydroxypropyl methacrylate
50 g of methacrylic acid
20 g of addition product of a glycidyl ester of a branched $C_{10}$-carboxylic acid and crotonic acid (1:1)
10 g of methacrylamide
8 g of sodium laurylethoxylate sulfate (with 2–6 moles of ethylene oxide)
10 g of lauryl mercaptan
4 g of ammonium perfluorooctyl sulfate and
900 g of water.

The emulsion was metered into a solution of 8 g of sodium laurylethoxylate sulfate (with 2–6 moles of ethylene oxide) in 600 g of water over 2 hours at 80° C. A solution of 2 g of ammonium peroxydisulfate in 40 g of water was added to the batch in parallel to the monomer emulsion. After completion of the introduction of the monomers, the mixture was stirred a further 3 hours at 80° C. After cooling down to room temperature, the copolymer dispersion was adjusted to a pH of 8.0 with an aqueous solution of dimethylaminoethanol. The copolymer dispersion had a solids content of 35%. Its minimum film-formation temperature was +16° C. and the glass temperature of the copolymer determined by differential thermal analysis (DTA) was +55° C.

EXAMPLE 2

A monomer emulsion was prepared from
170 g of styrene
170 g of methyl methacrylate
170 g of ethyl acrylate
170 g of vinyl ester of a branched saturated $C_{10}$-monocarboxylic acid having a carboxyl group on a tert. carbon atom
70 g of hydroxypropyl methacrylate
60 g of methacrylic acid
15 g of addition product of a glycidyl ester of a branched saturated $C_{10}$-carboxylic acid and acrylic acid (1:1)
10 g of methacrylamide
12 g of sodium laurylethoxylate sulfate (with 2–6 moles of ethylene oxide)
3 g of sodium perfluorooctyl sulfonate
10 g of lauryl mercaptan and
700 g of water
and this was metered into a solution of 8 g of sodium laurylethoxylate sulfate in 500 g of water over 2 hours at 80° C. The subsequent procedure was analogous to that in Example 1. A dispersion was obtained having a solids content of 38% and a glass temperature $T_G$ of the copolymer of +51° C.

EXAMPLE 3

A monomer emulsion was prepared from
200 g of styrene
140 g of methyl methacrylate
160 g of ethyl acrylate
180 g of vinyl ester of a branched saturated $C_{10}$-monocarboxylic acid having a carboxyl group on a tert. carbon atom
70 g of hydroxypropyl methacrylate
60 g of methacrylic acid
5 g of addition product of glycidyl ester of a branched saturated $C_{10}$-carboxylic acid and acrylic acid (1:1)
10 g of sodium lauryl sulfate
10 g of lauryl mercaptan and
700 g of water.

This monomer emulsion was metered into a solution of 8 g of sodium lauryl sulfate in 550 g of water according to the details of Example 1 and, during this, the polymerization was carried out with ammonium peroxydisulfate as the initiator.

The solids content of the dispersion was 38% and the glass temperature $T_G$ of the copolymer was +47° C.

EXAMPLE 4

A monomer emulsion was prepared from
200 g of styrene
200 g of methyl methacrylate
200 g of ethyl acrylate
180 g of vinyl ester of a branched saturated $C_{10}$-monocarboxylic acid having a carboxyl group on a tert. carbon atom
90 g of hydroxypropyl methacrylate
70 g of methacrylic acid
15 g of addition product of a glycidyl ester of a branched saturated $C_{10}$-carboxylic acid and acrylic acid (1:1)
10 g of sodium laurylethoxylate sulfate (with 2-6 moles of ethylene oxide)
4 g of sodium perfluorooctyl phosphonate
12 g of lauryl mercaptan and
680 g of water,
which, according to the procedure of Example 1, in a solution of 8 g of sodium laurylethoxylate sulfate (with 2-6 moles of ethylene oxide) and 550 g of water was brought to polymerization in the presence of ammonium peroxydisulfate. The copolymer dispersion had a solids content of 40% and a minimum film-formation temperature (MFT) of +26° C. The glass temperature $T_G$ of the copolymer was +53° C.

USE EXAMPLE 1

Preparation of a white lacquer paint based on the copolymer dispersion according to Example 1:

A. Pigment paste
40 g of hexamethoxymethylmelamine (50% in water)
3.0 g of sodium polyacrylate (25% in water)
1.6 g of addition product of 1 mole of nonylphenol and 6-10 moles of ethylene oxide
0.6 g of commercial defoamer
10.0 g of sodium nitrite (5% in water) and
160 g of titanium dioxide (rutile type)

B. Binder
540 g of copolymer dispersion (35% strength)

Part A was dispersed for 12 hours in a ball mill, then part B was mixed in and the batch was again ground for 10 hours in the ball mill. The white lacquer, having a flow viscometer time (according to DIN 53,211) of 20 seconds, was sprayed onto degreased steel plates and, after an airing time of 10 minutes, baked at 160° C. for 30 minutes.

The layer thickness was 35 μm, the gloss value (according to DIN 67,530) was 88% and the water-resistance value (according to the absorbent cotton-wad test method) was 1,100 hours.

EXAMPLE 5

A pigment-wetting agent was prepared from
92 g of methyl methacrylate
70 g of ethyl acrylate
25 g of hydroxypropyl methacrylate
13 g of acrylic acid
5 g of di-tert.-butyl peroxide
180 g of butyldiglycol and
5 g of lauryl mercaptan
by heating at 120° C. for 6 hours, the solids content of which was 51.5%. The acid number (according to DIN 53,402) was 47 and the hydroxyl number (according to DIN 53,783) was 50. The resin solution was diluted to a solids content of 45% with an aqueous solution of dimethylaminoethanol. The clear aqueous resin solution was employed in this form as a pigment-wetting agent.

USE EXAMPLE 2

Preparation of white lacquer paints based on the copolymer dispersions according to Examples 1, 2, 3 and 4 and the pigment-wetting agent according to Example 5:

A. Pigment paste
20.60 g of titanium dioxide (rutile type)
6.25 g of hexamethoxymethylmelamine
7.80 g of pigment-wetting agent (Example 5) and
0.20 g of commercial wetting agent B. Binder
55.45 g of copolymer dispersion according to Examples 1, 2, 3 and 4
9.55 g of pigment-wetting agent (Example 5) and
0.15 g of commercial corrosion inhibitor.

White lacquers were prepared according to Use Example 1 and applied by spraying to degreased steel plates. The white lacquer films were baked at 150° C. for 30 minutes in an oven heated by circulating air. The films were free of pits and had a layer thickness of 40 to 60 μm. The lacquer films exhibited a good gloss and good leveling. The values obtained in paint tests are recorded in Table 1.

TABLE 1

| Binder | Copolymer dispersion according to Example | | | |
|---|---|---|---|---|
| | 1 | 2 | 3 | 4 |
| Layer thickness (μm) | 45 | 40 | 50 | 55 |
| Fat resistance[x] | 0 | 0 | 0 | 0 |
| Pendulum hardness according to DIN 53,157 (s) | 160 | 170 | 175 | 165 |
| Gloss according to DIN 67,530 (%) | 91 | 90 | 88 | 92 |
| Xylene test[xx] (min) | 30 | 30 | 30 | 30 |
| Water test[xx] (h) | 1,450 | 800 | 750 | 2,200 |
| Caustics test[xx] (NaOH, 10%) | No attack after 96 hours | | | |

[x]: = best value, 5 = worst value
[xx]: wad of absorbent cotton test, as described.

USE EXAMPLE 3

Preparation of double-layer metal-effect lacquers with the copolymer dispersion according to Example 1:

The base coat was composed of a mixture of 10.5 g of oil-free polyester, 11.2 g of cellulose acetobutyrate, 2.5 g of commercial non-plasticized, reactive, partially etherified melamine resin and 5 g of aluminum pigment. The mixture was diluted to a flow viscometer time of 15 seconds in a 4 mm DIN cup (DIN 53,211) with a solvent mixture composed of xylene, butyl acetate and ethylene glycol monobutyl ether (2:7:1). This base coat was initially applied in a wet-layer thickness of 100 μm. After an airing time of 3 minutes at room temperature, the transparent lacquer top coat was applied, which top coat was composed of 215 g of the copolymer dispersion according to Example 1 and 11.7 g of hexamethoxymethylmelamine and had been diluted to a flow viscometer time of 18 seconds in a 4 mm DIN cup with a mixture of water and butylglycol (9:1). The double-layer metal-effect coating was then cured at 150° C. for 30 minutes. The metal-effect lacquer tested in the "Florida test" still showed a good maintenance of gloss and resistance to chalking after 12 months of exposure in Florida (for details of the FLORIDA test, see the FATIPEC Congress Report 1978, page 83).

USE EXAMPLE 4

Preparation of a metal-effect lacquer based on the copolymer dispersion according to Example 4:

For the preparation of a basic lacquer, a mixture of 6.5 g of thermosetting acrylate resin, which cross-links with foreign material, 1.4 g of a non-plasticized, reactive and partially etherified melamine resin and 6.8 g of aluminum pigment were homogeneously mixed. The mixture was then diluted to a flow viscometer time of 15 seconds in a 4 mm DIN cup (DIN 53,211) with a solvent mixture composed of xylene and butyl acetate (1:1). The lacquer mixture was applied to aluminum bonders and aired for 2 minutes. Then the transparent lacquer top coat, which was composed of a mixture of 180 g of the copolymer dispersion according to Example 4 and 9.2 g of hexamethoxymethylmelamine and which had been diluted to a flow viscometer time of 16 seconds in a 4 mm DIN cup with a mixture of water and butylglycol (8:2), was applied. This metal-effect coating prepared by the "wet-in-wet process" was then cured at 140° C. for 20 minutes. The metal-effect lacquers tested in the "Florida test" showed good gloss maintenance and chalking resistance after 12 months.

COMPARISION EXAMPLE A

An aqueous copolymer dispersion was prepared according to Example 1 of German Offenlegungsschrift No. 2,709,308, and this was processed to give a white lacquer according to Use Example 1 according to the invention. This white lacquer was sprayed onto degreased steel plates and baked at 150° C. for 30 minutes. The water-resistance of this lacquer film was tested by the wad of absorbent cotton test method. The maximum test values obtained were 120 hours.

We claim:

1. A process for the preparation of an aqueous dispersion of a copolymer which can be crosslinked with an aminoplast resin by the action of heat and which is prepared by copolymerization of monomers from the group comprising styrene, esters of acrylic acid, esters of methacrylic acid, vinyl esters, monoolefinic unsaturated monomers having hydroxyl groups, acrylic acid, methacrylic acid, and unsaturated amides, in an aqueous phase in the presence of a radical-forming initiator and an emulsifier, which comprises copolymerizing a mixture of 30 to 60 parts by weight of styrene, 20 to 50 parts by weight of an ester of acrylic acid or of methacrylic acid, the homopolymer of which has a glass temperature $T_G$ below $+50°$ C., or a mixture of these esters, 5 to 30 parts by weight of a vinyl ester of a branched saturated monocarboxylic acid, which has side chains having 8 to 12 carbon atoms and in which the carboxyl group is on a tertiary carbon atom, 5 to 15 parts by weight of a hydroxyalkyl ester of a monoolefinic unsaturated monocarboxylic acid, 0.5 to 15 parts by weight of an $\alpha,\beta$-unsaturated monocarboxylic acid and/or unsaturated dicarboxylic acid, and 0.1 to 8 parts by weight of an addition product of a glycidyl ester of a branched monocarboxylic acid with an unsaturated monocarboxylic or dicarboxylic acid.

2. The process as claimed in claim 1, wherein, in addition, 0.1 to 5 parts by weight of an unsaturated amide are copolymerized.

3. The product obtained according to the process as defined in claims 1 or 2.

* * * * *